Aug. 7, 1951  F. E. GAINES  2,563,715
SEPARABLE RIM FOR PNEUMATIC TIRES
Filed April 7, 1947
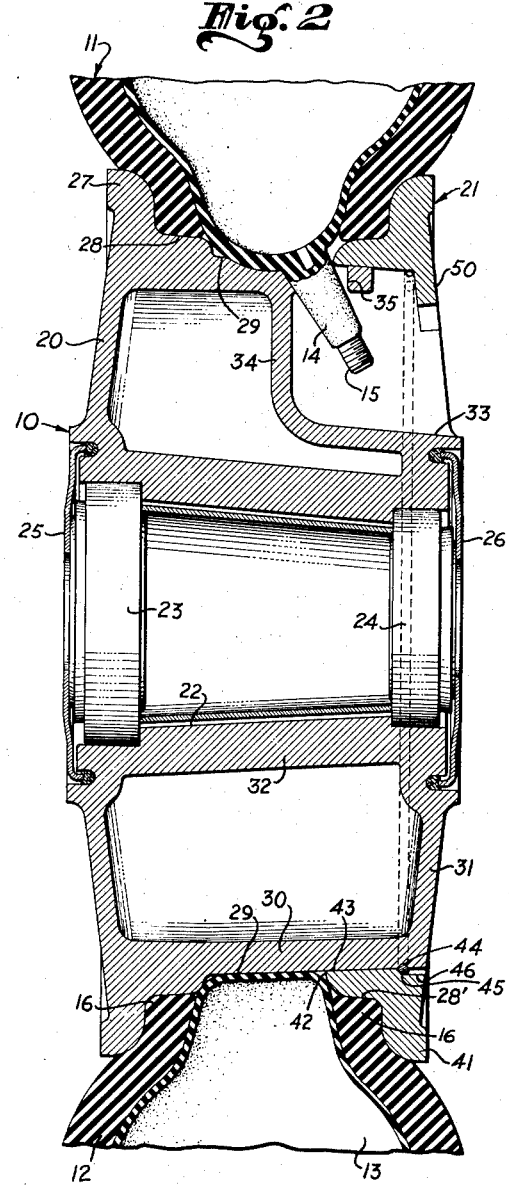
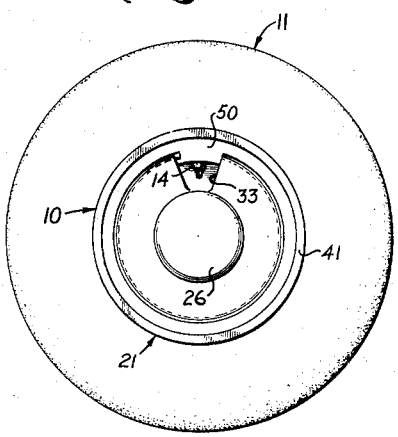
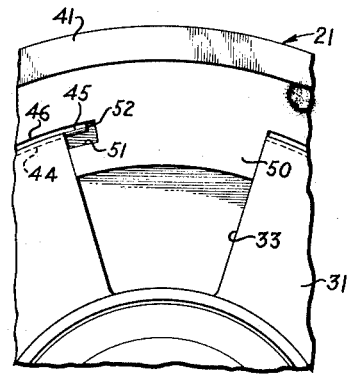
INVENTOR:
FRANK E. GAINES.
BY Huebner, Maltby
and Beehler
ATTORNEYS.

Patented Aug. 7, 1951

2,563,715

UNITED STATES PATENT OFFICE 2,563,715

SEPARABLE RIM FOR PNEUMATIC TIRES

Frank E. Gaines, Alhambra, Calif., assignor to Aerol Co. Inc., Los Angeles, Calif., a corporation of California Application April 7, 1947, Serial No. 739,757

6 Claims. (Cl. 152—410)

1

The invention relates to wheels which are particularly well suited for the mounting of conventional pneumatic tires.

A great many and variety of wheels and rims have heretofore been devised directed to the purpose of making it easy to mount a tire thereon upon and to remove a tire therefrom, usually for repairing a leak or puncture. For the most part, wheel or rim structures for this purpose have been of relatively large diameter, that is, of a size suitable for the wheels of an automobile.

With the advent of trailers using wheels of small diameter, and to some extent airplane wheels which are likewise of small diameter compared to the size of the tire, new problems have been presented in mounting and demounting the tires. When the rim is small in diameter in comparison with a cross-sectional diameter of the tire itself, the amount of stretch at the bead which engages the rim becomes small in proportion to the wheel or rim diameter, and the task of getting the shoe or outer casing of the tire over the rim into its place upon the wheel becomes increasingly difficult frequently necessitating the use of special tools. When the need arises for changing tires on the open road, special tools are not always available.

To overcome the difficulties encountered, some attempts have been made to provide wheels of small diameter with some special arrangement so that the rim portions thereof, or perhaps the entire wheel, might be separated for the removal and replacement of the tire and then reassembled. Whenever a wheel is made separable exceptional care must be taken to provide a construction which will be safe and secure under all circumstances but which will also be sufficiently easy to change so that the job of removing and replacing the tire does not become laborious and time-consuming.

It is, therefore, among the objects of the invention to provide a new and improved demountable type wheel which is simple in its construction, which contains a relative minimum number of individual parts and which can be inexpensively made and supplied to the trade at a price which is within the range of competitive prices for wheels already in use.

Another object of the invention is to provide a new and improved demountable type wheel or rim for pneumatic tires which is so designed that the principle parts can be cast in a single operation with a degree of tolerance which will allow the parts to be assembled one with another without it being necessary to do any considerable amount of machining upon the parts after they have been cast.

Still another object of the invention is to provide a new and improved separable wheel for tires wherein the operation of separating the wheel for removal and replacement of the tire is quick, easy, efficient and sufficiently simple to enable one not specially skilled to perform the operation.

Still further among the objects of the invention is to provide a new and improved separable wheel wherein locking parts are so designed as to provide a finger-grip for quickly disengaging one part of the wheel from another but which when in place will securely retain the parts together with the tire properly mounted thereon so that the wheel and tire assembly will run no risk under any circumstances of becoming separated either when the tire is inflated or under circumstances where it might be inadvertently deflated.

With these and other objects in view, the invention consists in the construction, arrangement and combination of the various parts of the device whereby the objects contemplated are attained, as hereinafter more fully set forth, pointed out in the claims and illustrated in the accompanying drawings, in which:

Figure 1 is a side elevational view of one form of the device drawn to a small scale and showing an inflated tire mounted thereon.

Figure 2 is a cross-sectional view of the device showing portions of a tire mounted thereon.

Figure 3 is a fragmentary elevational view showing in greater detail portions of the locking elements.

In the embodiment chosen for the purpose of illustration there is shown a wheel, indicated generally by the character 10. Upon the wheel is shown a pneumatic tire 11 comprising a casing 12 and an inner tube 13. It will be noted that the wheel diameter is relatively small compared with the cross-sectional diameter of the casing. The particular wheel shown is one frequently used upon one wheel and two wheel light trailers, but it is also conceivable that the same wheel might be used on such vehicles as airplanes, carts, trucks, wheelbarrows and similar types of rolling equipment.

The pneumatic tire construction designed to be used with the wheel may be of the conventional drop rim type wherein the inner tube 13 is provided with a rubber covered valve stem casing 14 terminating in a threaded sleeve 15 within which may be contained the usual type of air valve, not shown, and to which may be applied a cap of the customary sort. The shoe or casing may be provided with a rim or bead 16 in conformance with the usual practice; hence, it will be apparent that the wheel and its various parts is one designed to accommodate particularly pneumatic tires of the commercial variety.

The wheel itself consists of a body portion 20 and a removable rim 21. The body portion has a central aperture 22 provided with bearings 23 and 24 into which the axle or shaft of the vehicle may be fitted. Cover plates 25 and 26 may be provided, if desired. Any conventional axle mounting is suitable for this portion of the device.

Around the perimeter of the body at the inside circumference is a flange or rim 27 which curves inwardly and downwardly for reception of one of the beads 16 and which terminates in a land 28. Within the land is a drop rim portion 29. The body beneath the drop rim portion incorporates what may be termed a circumferential tire supporting base 30 which extends from the flange 27 outwardly to an outside partition or wall 31 which connects a hub portion 32 with the circumferential base 30. It will be noted that the wall 31 lies substantially in a plane outside of the outermost bead 16 of the shoe or casing.

At one portion of the wall 31 adjacent the circumference there is provided a deep recess 33 somewhat wedge-shaped in its general form as is apparent from an examination of Figures 1 and 3. In depth the recess extends inwardly so that an inner wall 34 thereof approaches a plane mid-way between the outside and inside of the wheel, this being adjacent the mid-point of the pneumatic tire.

Near the top of the inner wall 34 is a hole 35 adapted to support in part the rubber valve stem casing 14. The recess 33 is deliberately made relatively large so as to improve the ease of removing the valve cap and applying thereto an inflating valve.

In order to hold the pneumatic tire in place, there is provided the removable rim element 21 around the outer circumference of which is a flange 41, similar to the flange 27, which is adapted to engage the outer bead or rim 16 of the tire casing. The rim is so formed that the inner curved portion terminates in a land 28' and eventually turns downwardly so that a portion 42 joins the drop rim portion 29 of the body 20.

It is significant to note that the drop rim portion is pitched so as to slope to a smaller diameter near the outside of the wheel and that the rim element has provided an inside surface 43 correspondingly pitched so that it can slide snugly over the pitched surface of the drop rim portion.

As shown in the drawings and as referred to in the foregoing description, both the body and the rim are designed so as to embody walls and partitions of substantial thickness to facilitate casting both the body and the rim of materials commonly known as the light metals of the nature of aluminum and magnesium, although other metals may be equally well suited.

Near the outer edge of the surface comprising the drop rim portion there is provided an annular recess 44 within which may be positioned a snap ring 45 having a relatively wide space between its ends. The inside surface 43 is provided with a recess 46 having a depth approximately one-half of the cross-sectional diameter of the snap ring 45. The depth of the annular recess 44 may likewise be approximately one-half of the cross-sectional diameter of the snap ring. It may be advisable, however, to have the recess portion 46 diverging slightly with respect to the portion of the drop rim surface immediately opposite so that the rim element may be pushed inwardly with greater ease to release the snap ring.

The rim is provided at one portion of its circumference with a lug 50, the lug being somewhat wedge-shaped and adapted to fit comfortably within the recess 33. Of particular note, is the presence of a notch 51 at one side of the lug having a breadth substantially greater than the cross-sectional diameter of the snap ring 45.

In taking advantage of the construction just described it is important to have the space between an end 52 of the snap ring visible within the notch 51 in Figure 3 and the other end of the snap ring sufficiently great so that the end 52 may pass freely through the notch 51 whenever the other end coincides with the inside surface of the wall of the recess 33 on the opposite side.

In operation the body 20 of the wheel may or may not be positioned upon the axle of the vehicle with which it is to be used. If the wheel remains on the axle the axle will be supported upon a jack so that the casing 12 with the tube 13 in place can be slipped over the drop rim portion into position so that the inside bead 16 rests upon the land 28. It will, of course, be important to have the valve stem casing extending through the hole 35 into the recess 33. Preferably, the inner tube will be deflated while being thus mounted.

In order to hold the casing in place, the rim element 21 is then applied to the body. This is accomplished by sliding the surface 43 over the outermost portion of the drop rim surface 29. By reason of the pitches of the two surfaces just identified being similar, the inner edge of the rim can be very easily applied to the outer edge of the drop rim surface 29 because of a substantial difference in diameter at these points.

By providing these parts with sufficient tolerances, the rim may be then pushed inwardly far enough so that the outer face of the rim occupies a position inside of the location of the annular recess 44. A sufficient yieldability in the casing and also a sufficient difference in diameters of the drop rim surface and the inner surface 43 of the rim element will permit the movement just described. During this portion of the operation the lug 50 will likewise be pressed inwardly into a position well within the recess 33.

While the rim is held inwardly, the snap ring 45 is then applied to the annular recess 44 so that the end 52 occupies approximately the position shown in Figure 3 and so that the other end is approximately flush with, or perhaps a slight distance inside of the adjacent wall of the recess 33. As promptly as the ring assumes its position, the rim 21 may be released, and the resiliency of the tire casing either immediately or upon inflation will be sufficient to push the rim uniformly outwardly until the bottom of the recess 46 presses against the exposed portion of the snap ring.

At this point the rim will be locked in place by action of the snap ring within the recess of the body portion. There will be sufficient frictional resistance to hold the snap ring in the position shown so long as the parts remain thus assembled. This is noteworthy inasmuch as it is necessary to have the end 52 of the snap ring clear the bottom of the notch 51, not only when the snap ring is initially pressed outwardly into a locked position, but also later when the removable rim must be pressed inwardly in order to release the snap ring so that the rim can be removed and the casing taken off.

The tolerances referred to between the body and the rim element can be made sufficiently great so that they may be held with the necessary accuracy during an ordinary casting process. This permits of inexpensive manufacture and also enables the parts to be readily and easily assembled and disassembled. Specially smooth surfaces are found unnecessary, and the amount of friction between the various parts and particularly the interference between the snap ring and its annular recess and the groove in the rim will be great enough so that all of the parts hold the positions originally occupied when the parts are assembled without special locking attachments being necessary.

By reason of this fact, the wheel may, on occasions, actually be run while the pneumatic tire has been deflated because of a puncture or otherwise without danger of the parts separating. Running on a flat tire for a limited distance, moreover, will not be sufficient to cause the parts to slip out of place an amount sufficient to make disassembly a difficult operation.

By constructing a demountable rim or wheel in the manner shown there has been provided a wheel suited to the mounting of tires of relatively small rim diameter with ease and safety and which can be quickly and readily manipulated at virtually any time.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures.

Having described my invention, what I claim and desire to secure by Letters Patent is:

1. A separable rim structure comprising a tire supporting and retaining rim member and a removable rim member having a slip fit over the tire supporting portion of said first rim member, complementary recesses in mutually contacting faces of said rim members on the exterior sides thereof, snap means receivable jointly in said recesses and adapted when in place to hold said second rim member on the first rim member and against a tire mounted on said rim structure, engaging elements respectively on said rim members having mutually contacting faces in abutting relationship adapted to prevent relative rotation therebetween, and means forming an accommodation slot adjacent portions of the mutually contacting faces of the rim members adapted to provide access to one end of the snap means whereby to facilitate removal thereof.

2. A separable rim structure comprising a tire supporting and retaining rim member and a removable rim member adapted to fit over the tire supporting portion of said first rim member, complementary recesses in adjacent faces of said rim members on the exterior sides thereof, snap means receivable jointly in said recesses and adapted when in place to hold said second rim member on the first rim member and against a tire mounted on said rim structure, the adjacent surface on one of said rim members having an aperture, and a projection on the adjacent surface of the other rim member adapted to extend into said aperture in a position separating adjacent portions of said snap means.

3. A separable rim structure comprising a tire supporting and retaining rim member and a removable rim member having a slip fit over the tire supporting portion of said first rim member, complementary recesses in adjacent faces of said rim members on the exterior sides thereof, snap means receivable jointly in said recesses and adapted when in place to hold said second rim member on the first rim member and against a tire mounted on said rim structure, the adjacent surface on one of said rim members having an aperture, and a projection on the adjacent surface of the other rim member adapted to extend into said aperture in a position separating adjacent portions of said snap means, and means forming an accommodation slot in one of said rim members adjacent a portion of the snap means adapted to provide access to said snap ring.

4. A separable rim structure for mounting a vehicle tire, said structure comprising a body having a central hub, a rim portion and a midportion therebetween, said rim portion comprising an inner flange for retaining one side of a tire casing mounted on said rim structure, a surface adjacent thereto for supporting the casing, an annular snap ring depression in the surface of the rim adjacent the outer side, and a confining rim member having an inner surface adapted to surround the other surface and with a clearance therebetween, an annular recess at the outer edge of the inner surface, and a snap ring adapted to be received jointly in said depression and said recess, there being a lug adjoining one surface and a hollow adjoining the other surface said lug fitting in said hollow and separating free ends of said snap ring.

5. A separable rim structure for mounting a vehicle tire comprising a body having a hub, a rim portion and a connecting portion between the rim portion and the hub, said rim portion comprising an inner flange for retaining one side of a tire casing mounted on said rim structure, a surface adjacent thereto for supporting the casing gently sloping toward the axis of the wheel from the inner side toward the outer side, an annular snap ring depression in the surface of the rim adjacent the outer side, and a confining rim member having an inner surface gently sloping in a direction complementary to the slope of the surface of said rim portion, an annular recess at the outer edge of the inner surface, a snap ring adapted to be received jointly in said depression and said recess, there being a lug adjoining one surface and a hollow adjoining the other surface adapted to receive the lug, aperture means communicating between the hollow and the exterior of the surface of said rim portion, and means forming a slot adjacent the junction of said surfaces adapted to accommodate an end portion of said snap ring protruding into said hollow.

6. A separable rim structure for mounting a pneumatic tire having an exterior casing and an interior tube, said structure comprising a body having a central hub, a drop rim portion and a connecting portion between said rim portion and the hub, said drop rim portion comprising an inner flange for retaining a bead on one side of the casing, a land adjacent thereto for supporting the casing gently sloping toward the axis of the wheel from the inner side toward the outer side, and a central drop rim recess, said connecting portion having a substantially wedge shaped hollow adjacent the circumference and an aperture in the wall of the hollow communicating with the drop rim recess, an annular snap ring depression in the land adjacent the outer side, and a confining rim member having an inner surface gently sloping in a direction complementary to the slope of the land and with a clearance therebetween in operative position, an annular recess at the outer edge of the inner surface, a snap ring adapted to be received jointly in said depression and said recess, a lug on the rim member extending inwardly part way into the wedge shaped hollow and separating free ends of said snap ring, and a slot in one side of the lug adapted to accommodate an end portion of said snap ring protruding into said hollow.

FRANK E. GAINES.

REFERENCES CITED

The following references are of record in the file of this patent:

UNITED STATES PATENTS

| Number | Name | Date |
|---|---|---|
| 685,174 | Renard | Oct. 22, 1901 |
| 880,332 | Scott | Feb. 25, 1908 |
| 927,687 | Shaw | July 13, 1909 |
| 968,446 | Bryant | Aug. 23, 1910 |
| 1,493,040 | Klaus | May 6, 1924 |
| 2,357,000 | Hollerith | Aug. 29, 1944 |
| 2,367,788 | LeJeune | Jan. 23, 1945 |
| 2,468,947 | Sinclair | May 3, 1949 |

FOREIGN PATENTS

| Number | Country | Date |
|---|---|---|
| 624,674 | France | 1927 |
| 761,254 | France | 1934 |